Dec. 6, 1932.  E. HAMM  1,889,832
SAFETY DEVICE FOR USE WITH EARTHING CIRCUITS IN ALTERNATING CURRENT SYSTEMS
Filed April 13, 1932
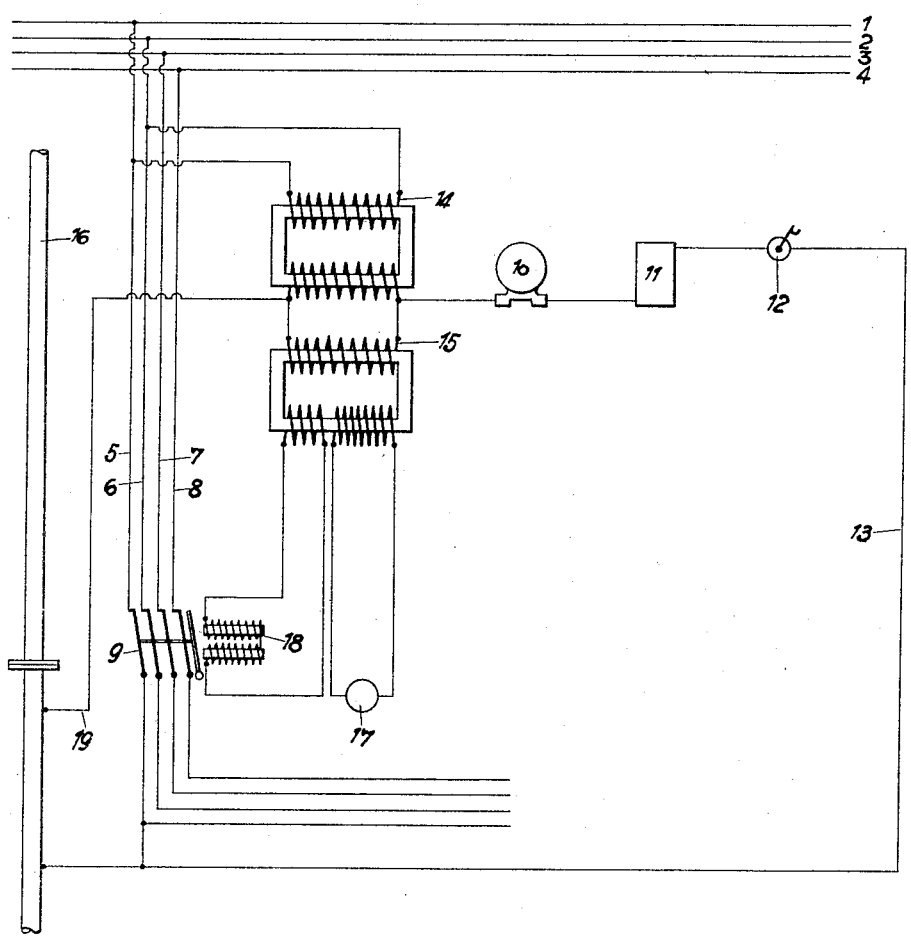
Inventor:

Patented Dec. 6, 1932

1,889,832

UNITED STATES PATENT OFFICE

EUGÈNE HAMM, OF STRASBOURG, FRANCE

SAFETY DEVICE FOR USE WITH EARTHING CIRCUITS IN ALTERNATING CURRENT SYSTEMS

Application filed April 13, 1932. Serial No. 604,944.

My invention has for its object to provide a safety device the operation of which depends upon the condition of the protective earth circuits usually employed in alternating current systems.

The object of the invention is to provide an indicating or protective device which becomes operative when a voltage arises in the earth circuit which would involve danger from contact with the body or frame of one of the appliances included in the earth circuit, or due to the breaking of a neutral wire or to a similar defect. The device operates first to give a signal and then if required, to switch off the current supply of the system. Furthermore, the earth circuit is guarded against faults developing therein, any excessive resistance or breakage being automatically indicated.

In my device the secondary of a transformer energized by the supply mains is connected to the primary of a second transformer whose secondary circuit comprises two windings, independent one of the other, the first including a signalling device and the other means for breaking the current supply to the appliances to be protected and the secondary of the first transformer is normally short circuited by an earthing circuit passing through the appliances to be protected, whereby the second transformer becomes energized when either (a) the short circuit is removed by breakage of the earthing circuit (b) an undue rise of potential occurs in the earthing circuit.

The accompanying drawing diagrammatically illustrates the device according to the invention for automatically protecting an earth circuit line.

1, 2, 3 and 4 denote the neutral wire and the several wires of a three phase alternating current system. To these wires are connected, as usual, branch wires 5, 6, 7, 8 passing through a main switch 9 and leading to various appliances to be supplied with current (motor 10, heater 11, switch 12). 13 denotes the earth wire of such appliances.

Now in my device the primary winding of a transformer 14 is coupled with the phase conductor 2 and the neutral conductor 1 of the alternating current supply, the secondary winding of said transformer being so designed that on open circuit a tension of 20 volts is never exceeded and that said tension drops considerably below such value under load. The transformer 14 is so designed and constructed that even if permanent short circuiting of the secondary winding takes place, no undue heating and consequent breakdown occurs.

To the terminals of the secondary winding of the transformer 14 is connected the primary winding of a further transformer 15. Moreover, one of said terminals is earthed, for example by being connected with a water main 16 through the intermediary of the auxiliary wire 19, while the other terminal is connected with the earth wire 13 by a circuit passing through the bodies of frames of the appliances 10, 11 and 12. The secondary circuit of the transformer 15 comprises two windings, one of which is connected to warning devices, such, for instance, as a lamp 17, and the other to a relay 18 adapted to throw the main switch 9 into the off position. Both these windings are calculated, so as the warning devices are actuated in the first place and the relay 18 when the danger is increasing.

Under normal operating conditions, the auxiliary wire 19 and the earth wire 13 are only subjected to a current of approximately 10 to 18 volts supplied by the secondary of transformer 14. As the resistance of the earthing circuit is very small, the transformer is almost short-circuited on the secondary side and little or no current is supplied to the primary of transformer 15.

If, however, the resistance of the earth circuit increases as, for example, if said circuit becomes broken, then most of the load upon the transformer 14 vanishes due to the removal of the short circuit. The tension at the terminals of the secondary circuit will then rise and the transformer 15 will receive current. This transformer will then supply sufficient current to energize first the signal lamp 17 and then operate the automatic break switch 9 by relay 18.

On the other hand, should the potential of the circuit through wire 19 and wire 13 rise, by reason of a short circuit to the body of one of the appliances included in the circuit, above 24 volts, an increased current will again flow from the secondary winding of the transformer 14 to the primary winding of the transformer 15. The transformers are so designed that the voltage produced in the secondary winding of the transformer 15 produces a current sufficient to operate the automatic circuit breaker 18, as well as the signal lamp.

I claim:

In a safety device for protective earthing circuits in alternating current installations comprising a transformer energized by the supply means a second transformer the primary of which is connected to the secondary of the first transformer and an earthing circuit passing through the appliances to be protected and short circuiting the secondary of the first transformer, two separate secondary windings for the second transformer, a signaling device, in the one and a device for breaking of the current supply in the other winding.

EUGÈNE HAMM.